US012394551B2

(12) United States Patent
Peng et al.

(10) Patent No.: US 12,394,551 B2
(45) Date of Patent: Aug. 19, 2025

(54) TRANSFORMER

(71) Applicant: Chicony Power Technology Co., Ltd., New Taipei (TW)

(72) Inventors: Tso-Jen Peng, New Taipei (TW); Ssu Hao Wang, New Taipei (TW); Mao-Song Pan, New Taipei (TW)

(73) Assignee: Chicony Power Technology Co., Ltd., New Taipei (TW)

(*) Notice: Subject to any disclaimer, the term of this patent is extended or adjusted under 35 U.S.C. 154(b) by 854 days.

(21) Appl. No.: 17/548,603

(22) Filed: Dec. 13, 2021

(65) Prior Publication Data

US 2023/0141926 A1 May 11, 2023

(30) Foreign Application Priority Data

Nov. 5, 2021 (TW) ................................ 110141320

(51) Int. Cl.

| | |
|---|---|
| ***H01F 27/06*** | (2006.01) |
| ***H01F 27/24*** | (2006.01) |
| ***H01F 27/28*** | (2006.01) |
| ***H01F 27/32*** | (2006.01) |

(52) U.S. Cl.

CPC ............. *H01F 27/06* (2013.01); *H01F 27/24* (2013.01); *H01F 27/28* (2013.01); *H01F 27/2871* (2013.01); *H01F 27/325* (2013.01)

(58) Field of Classification Search

CPC .... H01F 27/325; H01F 5/02; H01F 2005/022; H01F 2005/046; H01F 27/2866; H01F 27/2871; H01F 27/32; H01F 27/323; H01F 27/06; H01F 27/24; H01F 27/28

USPC ................................ 336/196, 198, 199, 208

See application file for complete search history.

(56) References Cited

U.S. PATENT DOCUMENTS

| | | | | |
|---|---|---|---|---|
| 9,224,530 | B2 | 12/2015 | Kim et al. | |
| 9,406,419 | B2 | 8/2016 | Njiende T et al. | |
| 10,210,990 | B2 * | 2/2019 | Chou | H01F 27/2866 |
| 10,381,934 | B2 | 8/2019 | Yang et al. | |
| 10,971,290 | B2 | 4/2021 | Lu et al. | |
| 2009/0295527 | A1 * | 12/2009 | Silva | H01F 3/14 29/606 |

(Continued)

FOREIGN PATENT DOCUMENTS

| | | |
|---|---|---|
| CN | 201886878 | 6/2011 |
| CN | 103617879 A * | 3/2014 |

(Continued)

*Primary Examiner* — Tszfung J Chan

(74) *Attorney, Agent, or Firm* — JCIPRNET

(57) ABSTRACT

A transformer including a winding frame, a first coil, a second coil, a locating piece, and two iron core pieces is provided. The winding portion has a through hole. The first baffle and the second baffle are respectively and horizontally extended from two opposite ends of the winding portion. The terminal socket is connected to the second baffle. The first coil is wound on the winding portion and electrically coupled to the terminal socket. The second coil is disposed around the first coil and the two are spaced apart from each other. The second coil has a plurality of copper sheets located between the first baffle and the second baffle. The locating piece is correspondingly disposed on the winding frame to locate the second coil. The two iron core pieces are respectively disposed on the second baffle of the winding frame and the locating piece.

14 Claims, 9 Drawing Sheets

(56) References Cited

U.S. PATENT DOCUMENTS

2014/0184378 A1* 7/2014 Wild .................... H01F 27/325
336/207

FOREIGN PATENT DOCUMENTS

| | | | | | |
|---|---|---|---|---|---|
| CN | 206432122 | | | 8/2017 | |
| CN | 107424768 | | | 12/2017 | |
| CN | 208045288 | | | 11/2018 | |
| CN | 213243798 | U | * | 5/2021 | |
| DE | 4240348 | A1 | * | 6/1993 | ........... H01F 27/255 |
| JP | H0244498 | Y2 | * | 11/1990 | |
| JP | 2021002590 | A | * | 1/2021 | ............. H01F 27/26 |
| KR | 101177061 | B1 | * | 8/2012 | |
| KR | 2012138713 | A | * | 12/2012 | ............... G09G 3/30 |
| KR | 2016025933 | A | * | 3/2016 | ............. H01F 27/24 |
| KR | 2017008072 | A | * | 1/2017 | ............. H01F 27/24 |
| TW | M531038 | | | 10/2016 | |
| TW | M542844 | | | 6/2017 | |

* cited by examiner

TRANSFORMER

CROSS-REFERENCE TO RELATED APPLICATION

This application claims the priority benefit of Taiwan application serial no. 110141320, filed on Nov. 5, 2021. The entirety of the above-mentioned patent application is hereby incorporated by reference herein and made a part of this specification.

BACKGROUND

Technical Field

The disclosure relates to a transformer, and in particular to a transformer for use in an electronic appliance.

Description of Related Art

Regarding an existing transformer used in a high-wattage electronic appliance, in order to reduce the size and increase the power density, a high-frequency design is usually used for switching frequency, so that a magnetic component with a smaller effective core area may be used in the transformer to reduce the volume of the transformer. An existing high-frequency transformer is an LLC architecture that combines winding and copper sheets. However, the copper sheets of the existing high-frequency transformer are stacked on the upper and lower sides of the winding, so that air gaps exist between the copper sheets and the winding. When the transformer is energized and operated, the air gaps generate magnetic flux leakage and form a magnetic field, thus causing the loss of eddy current.

SUMMARY

The disclosure provides a transformer, which avoids the situation of air gaps being generated between winding and a copper sheet so as to reduce magnetic leakage and eddy current loss.

A transformer of the disclosure includes a winding frame, a first coil, a second coil, a locating piece, and two iron core pieces. The winding frame has a winding portion, a first baffle, a second baffle, and a terminal socket. The winding portion has a through hole. The first baffle and the second baffle are respectively and horizontally extended from two opposite ends of the winding portion. The terminal socket is connected to the second baffle. The first coil is wound on the winding portion and is electrically coupled to the terminal socket. The second coil is disposed around the outside of the first coil and the first coil and the second coil are spaced apart from each other. The second coil has a plurality of copper sheets, located between the first baffle and the second baffle. The locating piece is correspondingly disposed on the winding frame and is used to locate the second coil. The two iron core pieces are respectively disposed on the second baffle of the winding frame and the locating piece, and the two iron core pieces are disposed so as to pass through the through hole of the winding portion.

Based on the above, in the transformer of the disclosure, the first coil is wound on the winding portion, and the second coil is disposed around the outside of the first coil. Therefore, the second coil is wrapped around the periphery of the first coil while the above two are spaced apart from each other instead of being stacked on each other, so that no air gap exists between the second coil and the first coil. Thus, the magnetic leakage phenomenon generated by the transformer after the transformer is energized and operated is avoided, and the loss of eddy current is reduced.

DESCRIPTION OF THE EMBODIMENTS

Figure 1A:
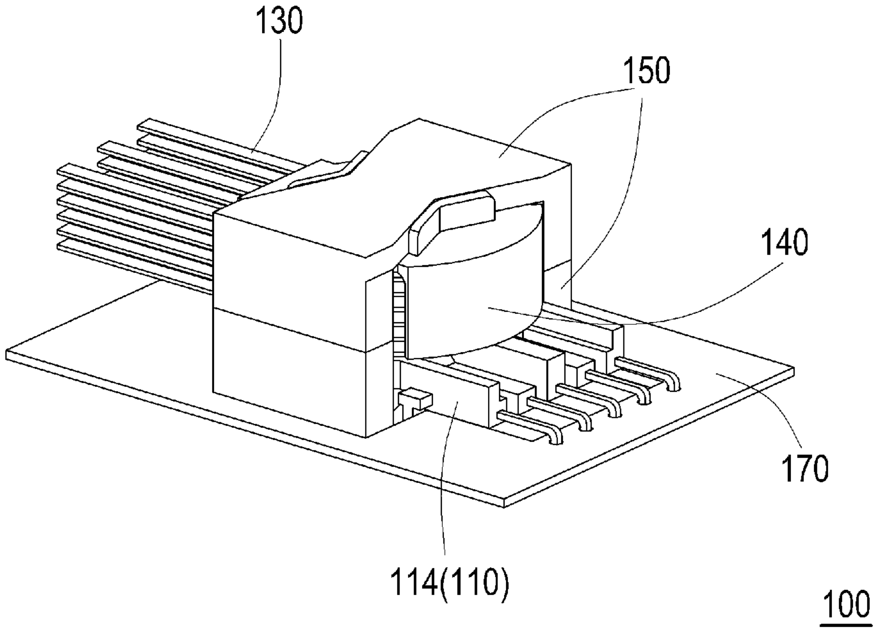
FIG. 1A is a perspective schematic view of a transformer according to an embodiment of the disclosure.
Figure 1B:
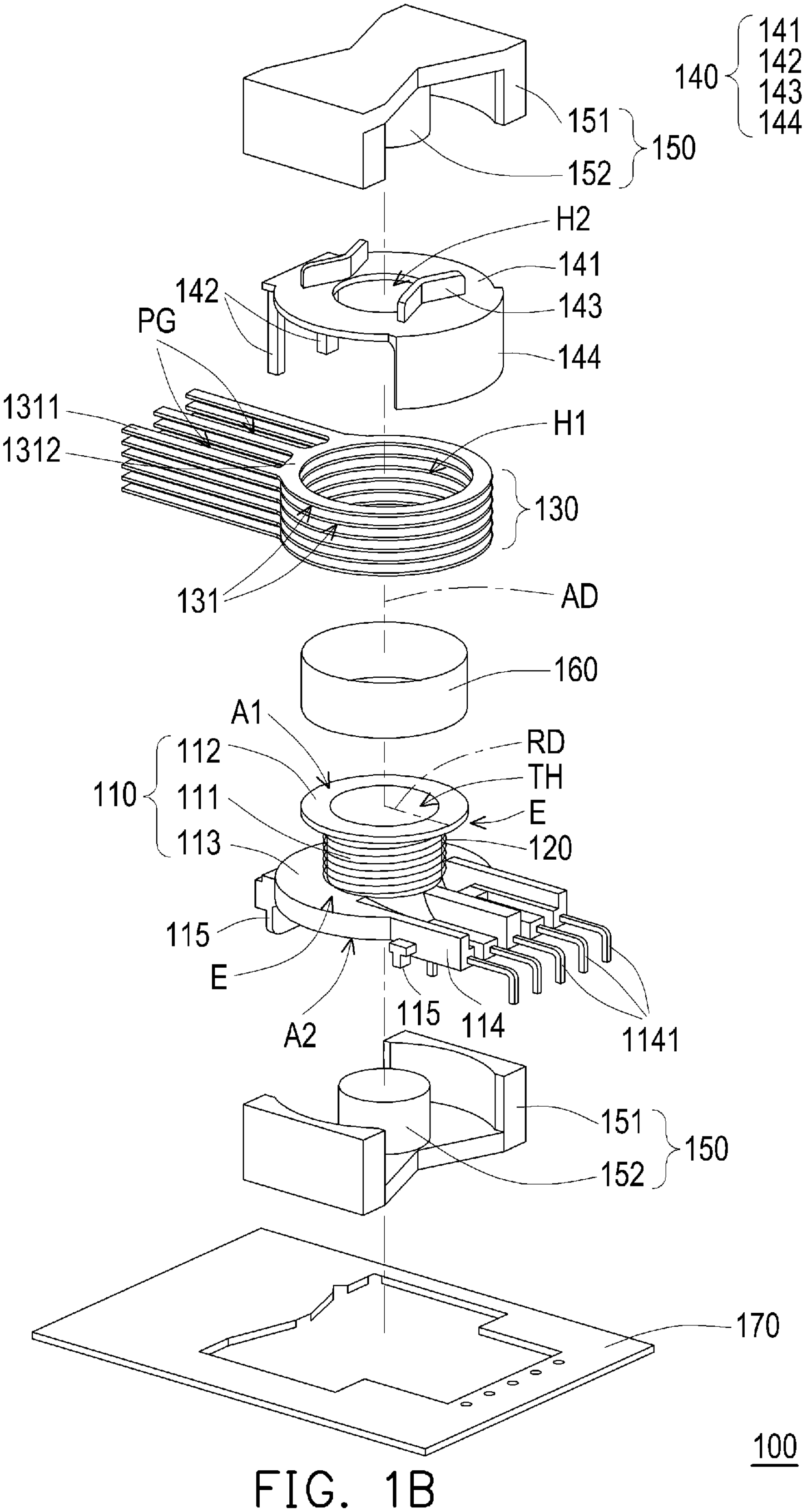
FIG. 1B is an exploded schematic view of components of the transformer of FIG. 1A.

Referring to FIGS. 1A and 1B, a transformer 100 of the disclosure includes a winding frame 110, a first coil 120, a second coil 130, a locating piece 140, and two iron core pieces 150.

The winding frame 110 has a winding portion 111, a first baffle 112, a second baffle 113, and a terminal socket 114, and the winding frame 110 is made of an insulating material. The winding portion 111 has a through hole TH and has a hollow tube structure, and the through hole TH penetrates the winding portion 111. The first baffle 112 and the second baffle 113 are respectively and horizontally extended from two opposite ends E of the winding portion 111. The terminal socket 114 is connected to the second baffle 113 and has a plurality of electrical terminals 1141. The electrical terminals 1141 extend from the outer edge of the terminal socket 114 toward the direction away from the winding frame 110, and the electrical terminals 1141 are bent at 90 degrees relative to the terminal socket 114 to form an L-shaped appearance.

The first coil 120 is wound on the winding portion 111 of the winding frame 110 and is electrically coupled to the electrical terminals 1141 of the terminal socket 114. The second coil 130 is disposed around the outside of the first coil 120 and the above two are spaced apart from each other; that is, the second coil 130 is wrapped around the periphery of the first coil 120 and the two does not contact each other. The second coil 130 has a plurality of copper sheets 131 located between the first baffle 112 and the second baffle 113. The locating piece 140 is correspondingly disposed on the winding frame 110, and is used to locate the copper sheets 131 of the second coil 130. The two iron core pieces 150 are respectively disposed on the second baffle 113 of the winding frame 110 and the locating piece 140, and the two iron core pieces 150 are disposed so as to pass through the through hole TH of the winding portion 111 and are electrically coupled to each other.

Figure 1C:
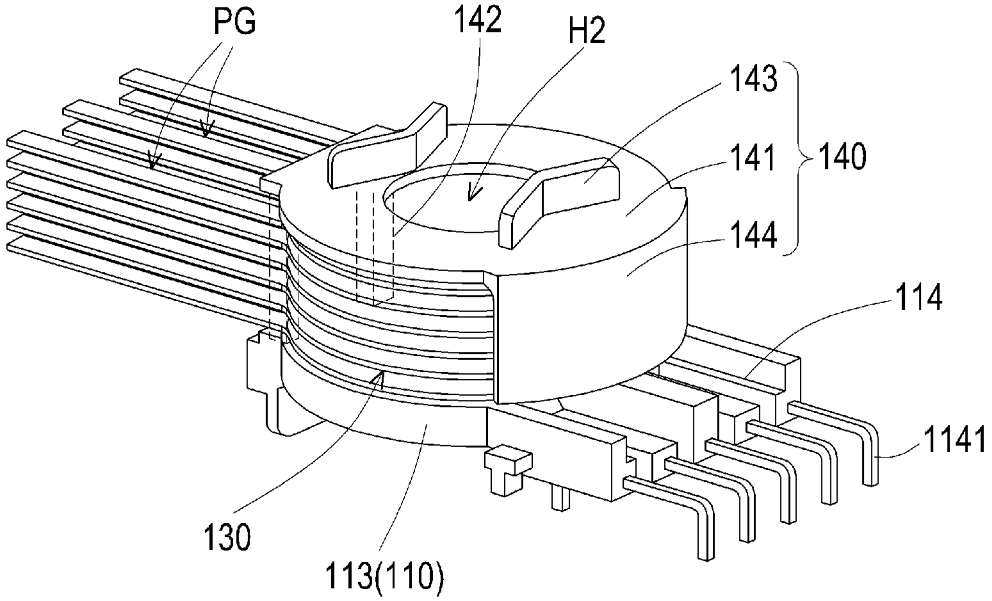
FIG. 1C is a perspective schematic view of a locating piece of the transformer of FIG. 1A being engaged with a second coil.
Figure 1D:
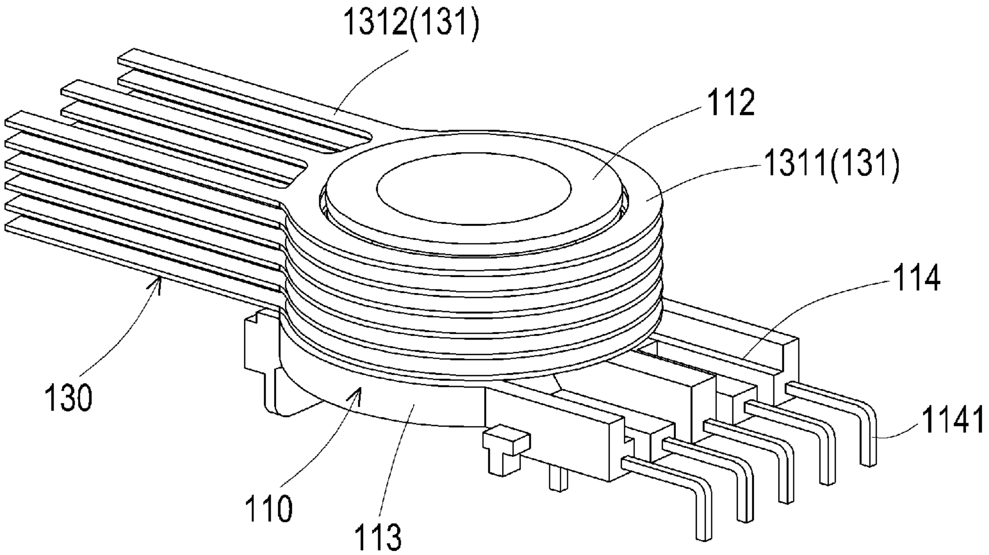
FIG. 1D is a perspective schematic view of the second coil of the transformer in FIG. 1A being wrapped around a winding frame.
Figure 1E:
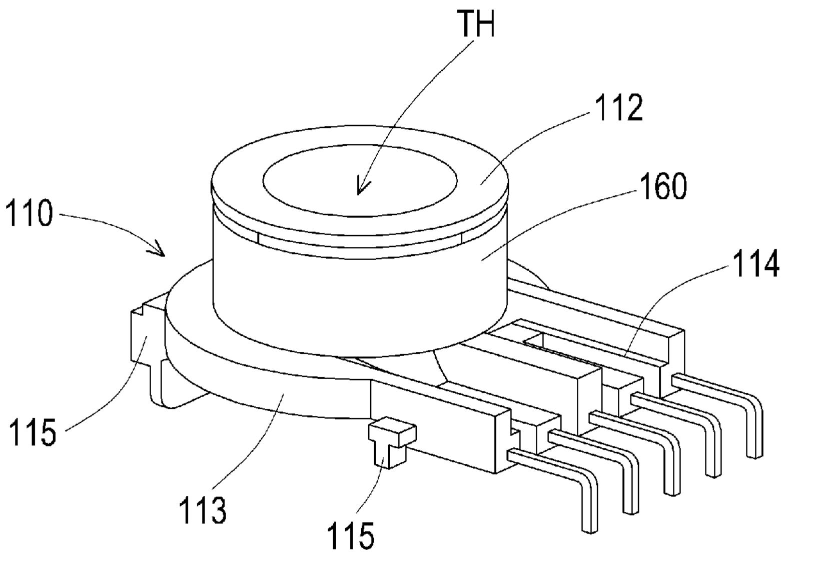
FIG. 1E is a perspective schematic view of an insulating layer of the transformer in FIG. 1A being wrapped around the winding frame.

Referring to FIGS. 1C to 1E, the transformer 100 further includes an insulating layer 160, wrapped around the outside of the first coil 120 and blocks the second coil 130, so that the first coil 120 is insulated from the second coil 130. In other words, the insulating layer 160 is located between the first coil 120 and the second coil 130 to prevent the first coil 120 and the second coil 130 from contacting and conducting each other.

Referring to FIGS. 1B, 1D to 1F, in this embodiment, a first area A1 of the first baffle 112 is smaller than a second area A2 of the second baffle 113. An opening H1 of the second coil 130 is adapted to pass through the first baffle 112 and the second coil 130 abuts against the second baffle 113, so that the second coil 130 is wrapped around the winding frame 110 and completely covers the first coil 120, and the second coil 130 and the first coil 120 overlap each other in a radial direction RD of the winding frame 110. Based on the assembly method of the first coil 120 (a primary side coil) and the second coil 130 (a secondary side coil) used in this embodiment overlapping in the radial direction RD, no air gap exists between the second coil 130 and the first coil 120, so the magnetic leakage phenomenon may be reduced.

Figure 1F:
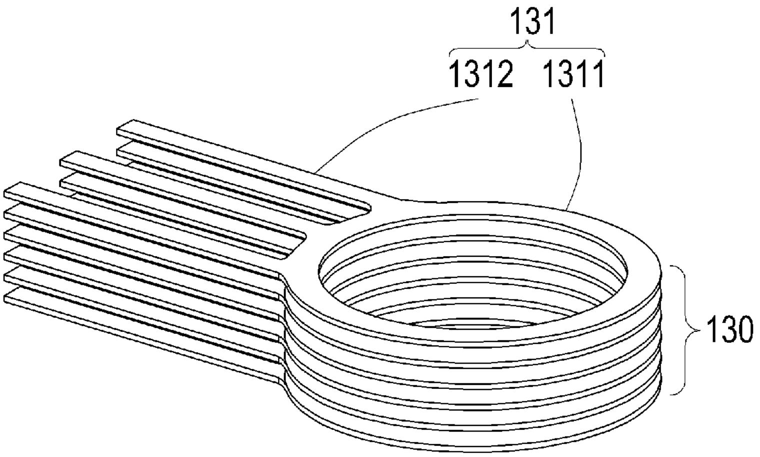
FIG. 1F is a perspective schematic view of the second coil of the transformer of FIG. 1A.

Referring to FIG. 1F, each copper sheet 131 of the second coil 130 has an annular main-body 1311 and a plurality of pins 1312. The pins 1312 extend outward from the annular main-body 1311, and the pins 1312 are parallel to each other. In this embodiment, the pins 1312 have a linear appearance and are perpendicular to an axial direction AD of the winding frame 110. The second coil 130 is stacked along the axial direction AD passing through the winding portion 111, and the pins 1312 jointly form two locating slots PG.

Referring to FIGS. 1A and 1*i*, the winding frame 110 has two first locating portions 115, respectively disposed on the second baffle 113 and the terminal socket 114, and the two first locating portions 115 are engaged with the corresponding one of the iron core pieces 150 to avoid shaking or separation of the winding frame 110 and the corresponding iron core piece 150.

Referring to FIGS. 1A and 1B, the locating piece 140 has a ring plate 141, two locating mounts 142, two second locating portions 143, and a blocking plate 144. The ring plate 141 has an opening H2, aligned with the through hole TH of the winding portion 111. The two locating mounts 142 are disposed on the outer edge of the ring plate 141 and extend toward the second baffle 113, and the two second locating portions 143 are disposed on an upper surface TS of the ring plate 141. The blocking plate 144 is disposed on the outer edge of the ring plate 141 and is opposite to the two locating mounts 142.

Referring to FIG. 1C, the two locating mounts 142 are disposed around the two locating slots PG of the second coil 130, and the two locating mounts 142 are used to limit the pins 1312 of the copper sheets 131, so as to avoid the situation of the copper sheets 131 being separated from each other and the pins 1312 being misaligned. The two second locating portions 143 are engaged with the corresponding iron core piece 150. The blocking plate 144 partially encapsulates the second coil 130. Specifically, through the limiting effect of the blocking plate 144 and the two second locating portions 143, the annular main-bodies 1311 of the copper sheets 131 may be limited on the second baffle 113.

Referring to FIGS. 1A and 1*i*, each of the iron core pieces 150 has a case 151 and a column 152. The column 152 is disposed in the case 151, and the column 152 of one iron core piece 150 is disposed so as to pass through the locating piece 140 and enters the through hole TH of the winding frame 110. The column 152 of another iron core piece 150 is disposed so as to pass through the second baffle 113 and enters the through hole TH of the winding frame 110. In this embodiment, the number of iron core pieces 150 is two. The two cases 151 of the two iron core pieces 150 are electrically coupled to each other and are wrapped around the outside of the second coil 130, and the two case 151 are misaligned with the two second locating portions 143 and the blocking plate 144 of the locating piece 140. The two columns 152 of the two iron core pieces 150 are electrically coupled to each other in the through hole TH, and the two iron core pieces 150 form a loop.

Referring to FIGS. 1A and 1B, a circuit board 170 is further included. The circuit board 170 is disposed on the corresponding iron core piece 150 and is electrically coupled to the electrical terminals 1141 of the terminal socket 114.

Figure 2A:
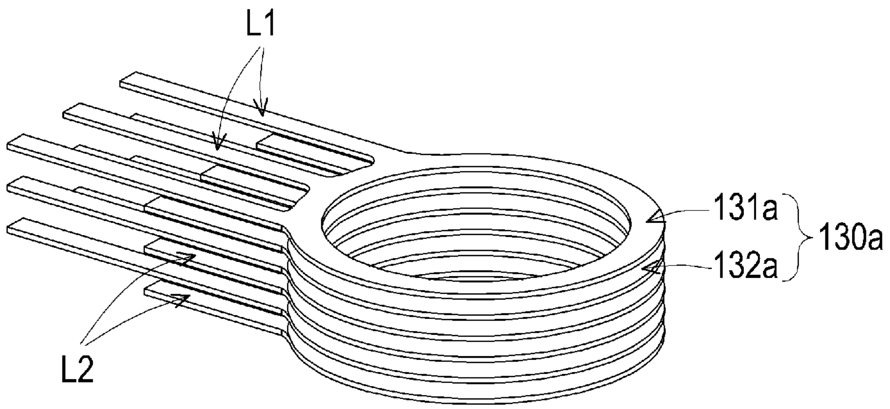
FIG. 2A is a perspective view of the second coil according to another embodiment of the disclosure.

FIG. 2A is a perspective view of the second coil according to another embodiment of the disclosure.

Referring to FIG. 2A, in this embodiment, a plurality of copper sheets of a second coil 130*a* include at least one first copper sheet 131*a* and at least one second copper sheet 132*a*. A first pin length L1 of the at least one first copper sheet 131*a* is different from a second pin length L2 of the at least one second copper sheet 132*a*. In this embodiment, the first pin length L1 is greater than the second pin length L2, and in other embodiments, the first pin length L1 is smaller than the second pin length L2.

Specifically, the second coil of this embodiment has different pin lengths, adapted for electronic appliances of different specifications.

Figure 2B:
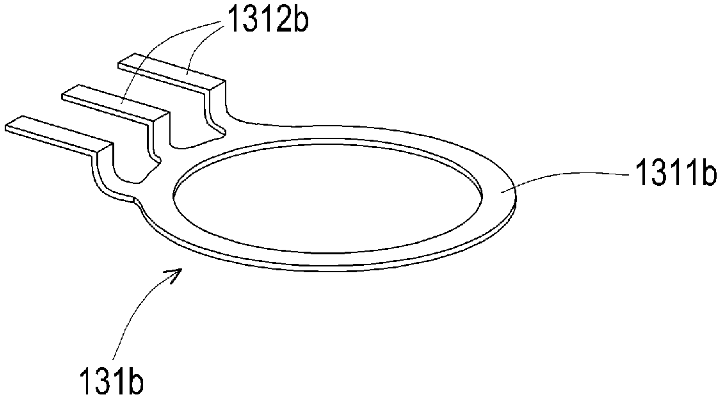
FIG. 2B is a perspective view of the second coil according to another embodiment of the disclosure.

FIG. 2B is a perspective view of the second coil according to another embodiment of the disclosure.

Referring to FIG. 2B, in this embodiment, each copper sheet 131*b* of the second coil has an annular main-body 1311*b* and a plurality of pins 1312*b*, and the pins 1312*b* extend from the annular main-body 1311*b* and has a bent appearance.

Specifically, the second coil of this embodiment has pins with a bent appearance, adapted for electronic appliances of different specifications.

Figure 2C:
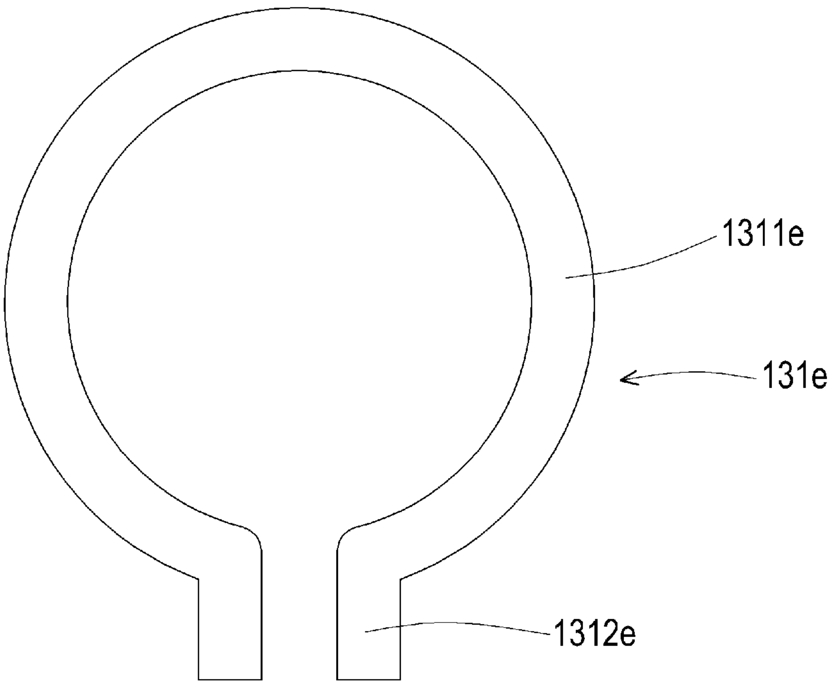
FIG. 2C is a perspective view of the second coil according to another embodiment of the disclosure.

FIG. 2C is a perspective view of the second coil according to another embodiment of the disclosure.

Referring to FIG. 2C, in this embodiment, each copper sheet 131*e* has an annular main-body 1311*e* and two pins 1312*e*, and the two pins 1312*e* are respectively formed on two ends of the annular main-body 1311*e*, and the two pins 1312*e* are spaced apart from each other.

Figure 3A:
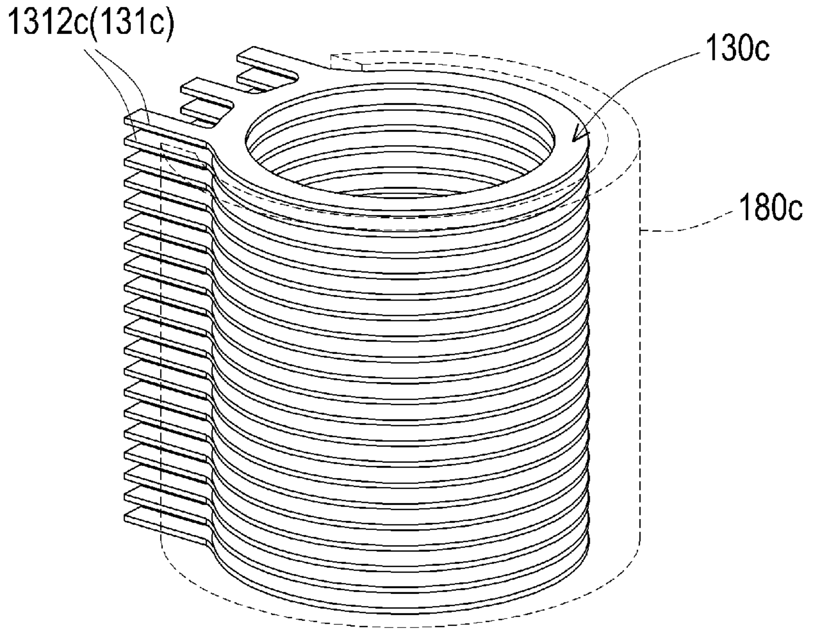
FIG. 3A is a perspective view of the second coil according to another embodiment of the disclosure combined with a cylindrical housing.
Figure 3B:
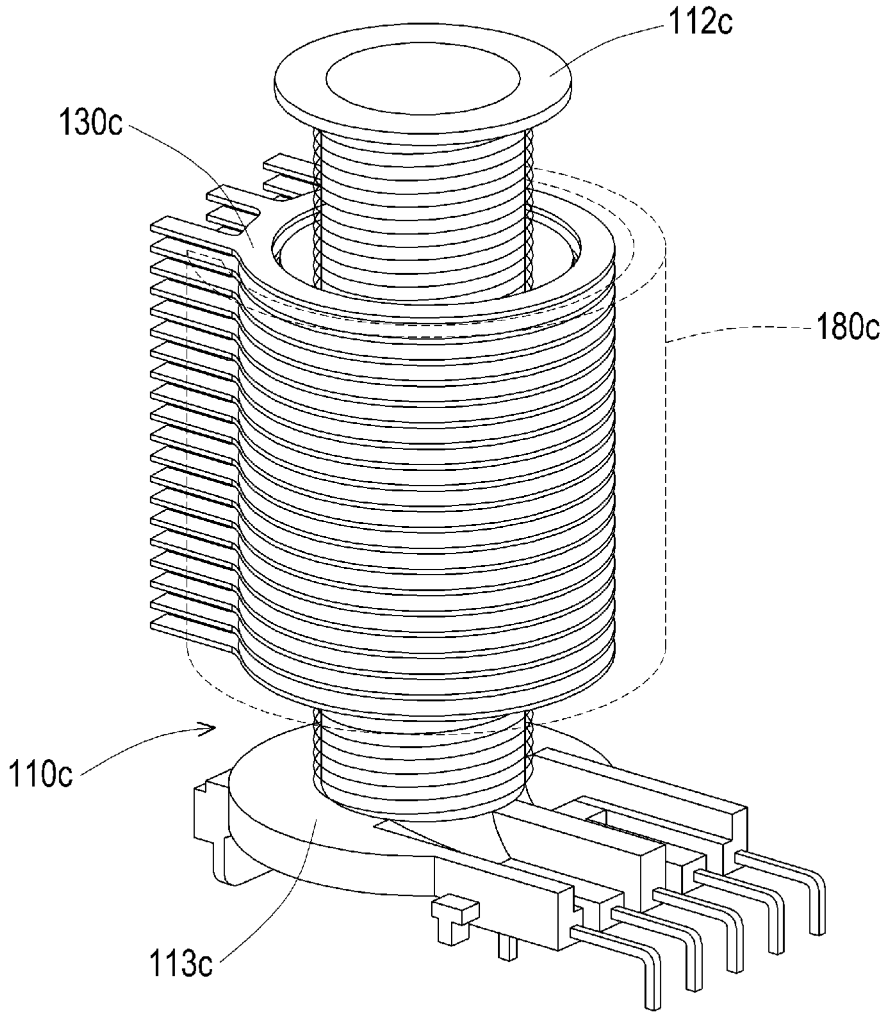
FIG. 3B is a perspective schematic view of the second coil of FIG. 3A disposed around the winding frame.

FIG. 3A is a perspective view of the second coil according to another embodiment of the disclosure combined with a cylindrical housing. FIG. 3B is a perspective schematic view of the second coil of FIG. 3A disposed around the winding frame.

Referring to FIGS. 3A and 3B, a cylindrical housing 180*c* is further included, and a second coil 130*c* is disposed in the cylindrical housing 180*c*. Specifically, a plurality of copper sheets 131*c* of the second coil 130*c* are stacked on each other in the cylindrical housing 180*c*, and the copper sheets 131*c* are disposed around a winding frame 110*c* and are located between a first baffle 112*c* and a second baffle 113*c*. A plurality of pins 1312*c* of the copper sheets 131*c* protrude from the cylindrical housing 180*c*. The cylindrical housing 180*c* is made of an insulating material, so that the magnetic field generated by the second coil 130*c* is concentrated in the cylindrical housing 180*c*, thereby further reducing the magnetic leakage phenomenon.

Figure 4:
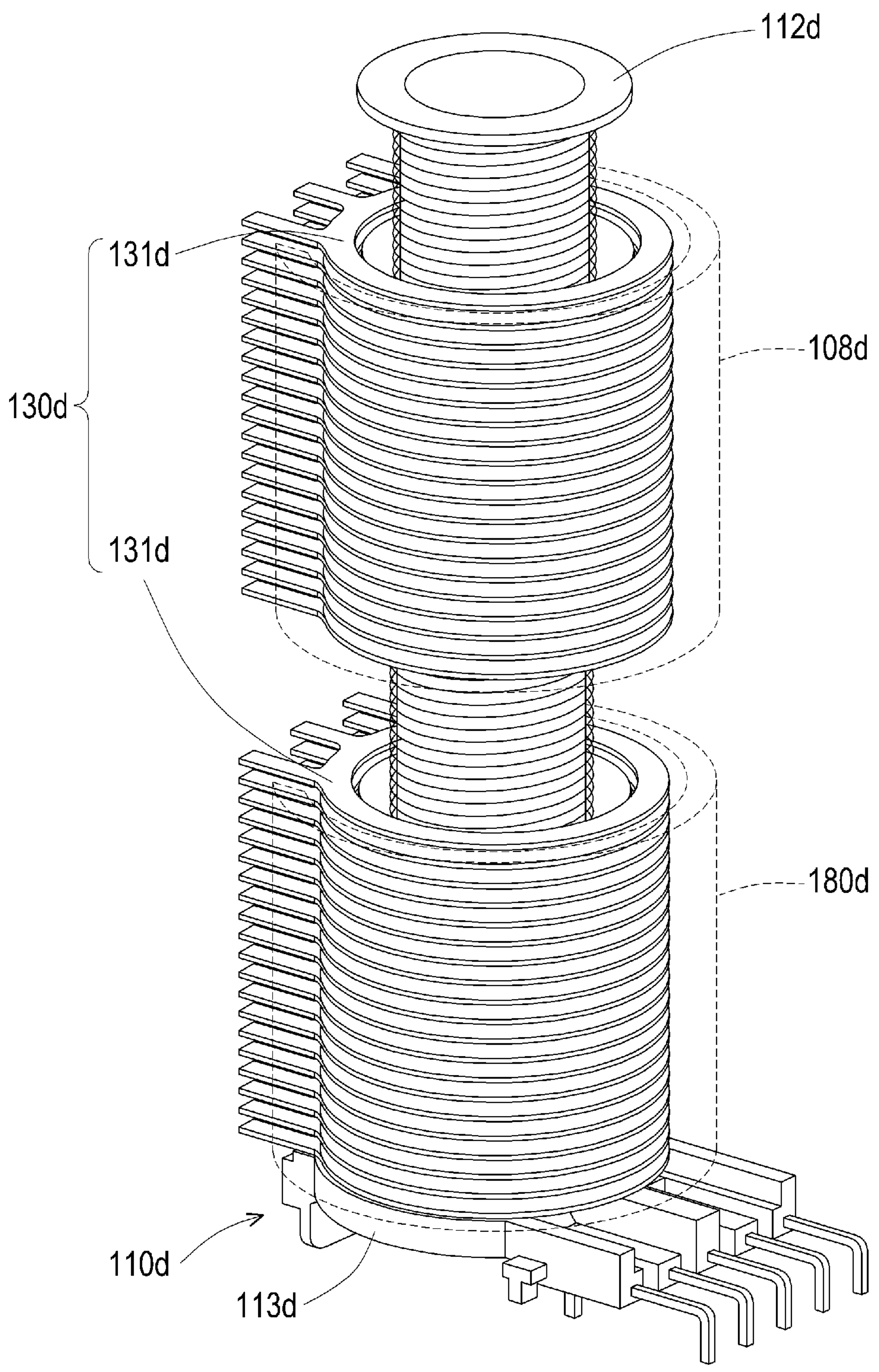
FIG. 4 is a perspective schematic view of the second coil according to another embodiment of the disclosure combined with the cylindrical housing.

FIG. 4 is a perspective schematic view of the second coil according to another embodiment of the disclosure combined with the cylindrical housing.

Referring to FIG. 4, a plurality of cylindrical housings 180*d* are included, and a plurality of copper sheets 131*d* of a second coil 130*d* are respectively disposed in the corresponding cylindrical housings 180*d*. Specifically, the copper sheets 131*d* of the second coil 130*d* are respectively stacked on each other in the cylindrical housings 180*d*, and the copper sheets 131*d* are disposed so as to pass through a winding frame 110*d* and are located between a first baffle 112*d* and a second baffle 113*d*, and the cylindrical housings 180*d* are spaced apart from each other. A plurality of pins 1312*d* of the copper sheets 131*d* respectively protrude from the corresponding cylindrical housing 180*d*. The cylindrical housing 180*d* is made of an insulating material, so that the magnetic field generated by the second coil 130*d* is concentrated in the cylindrical housing 180*d*, thereby further reducing the magnetic leakage phenomenon.

In summary, in the transformer of the disclosure, the first coil is wound on the winding portion, and the second coil is disposed around the outside of the first coil. Therefore, the second coil is wrapped around the periphery of the first coil while the above two are spaced apart from each other instead of being stacked on each other, so that no air gap exists between the second coil and the first coil. Thus, the magnetic leakage phenomenon generated by the transformer after the transformer is energized and operated may be avoided, and the loss of eddy current may be reduced.

Furthermore, in the transformer of the disclosure, the first coil (the primary side coil) thereof may be electrically connected to the circuit board through a plurality of electrical terminals of the terminal socket, and this connection method replaces the existing flying lead connection method; and the second coil (the secondary side coil) thereof has a plurality of copper sheets stacked on each other and is wrapped around the outside the first coil. Compared with the current transformer, the transformer of the disclosure has the technical effect of reducing power consumption and lowering operating temperature.

What is claimed is:

1. A transformer, comprising:

a winding frame, having a winding portion, a first baffle, a second baffle, and a terminal socket, wherein the winding portion has a through hole, the first baffle and the second baffle are respectively extended from two opposite ends of the winding portion, and the terminal socket is connected to the second baffle;

a first coil, wound on the winding portion and electrically coupled to the terminal socket;

a second coil, disposed around the outside of the first coil, wherein the first coil and the second coil are spaced apart from each other, the second coil has a plurality of copper sheets, and the plurality of copper sheets are located between the first baffle and the second baffle;

a locating piece, correspondingly disposed on the winding frame, used to locate the second coil; and two iron core pieces, respectively disposed on the second baffle of the winding frame and the locating piece, wherein the two iron core pieces are disposed so as to pass through the through hole of the winding portion, wherein the locating piece has a ring plate, two locating mounts, two second locating portions, and a blocking plate, wherein the ring plate has an opening, aligned with the through hole of the winding portion, the two locating mounts are disposed on an outer edge of the ring plate and extend toward the second baffle, the two second locating portions are disposed on an upper surface of the ring plate, and the blocking plate is disposed on the outer edge of the ring plate and is opposite to the two locating mounts.

2. The transformer according to claim 1, wherein the winding frame has two first locating portions, respectively disposed on the second baffle and the terminal socket, and the two first locating portions are engaged with the corresponding iron core piece.

3. The transformer according to claim 1, wherein the two locating mounts are disposed so as to pass through the second coil, the two second locating portions are engaged with the corresponding iron core piece, and the blocking plate partially encapsulates the second coil.

4. The transformer according to claim 1, further comprising an insulating layer, wrapped around the outside of the first coil and blocking the second coil, so that the first coil is insulated from the second coil.

5. The transformer according to claim 1, wherein each of the copper sheets has an annular main-body and a plurality of pins, the plurality of pins extend outward from the annular main-body, and the plurality of pins are parallel to each other.

6. The transformer according to claim 5, wherein the plurality of copper sheets of the second coil are stacked on each other along an axial direction passing through the winding portion, and the plurality of pins jointly form two locating slots.

7. The transformer according to claim 1, wherein the copper sheets comprise at least one first copper sheet and at least one second copper sheet, and a first pin length of the at least one first copper sheet is different from a second pin length of the at least one second copper sheet.

8. The transformer according to claim 1, wherein each of the copper sheets has an annular main-body and a plurality of pins, and the pins extend from the annular main-body and have a bent appearance.

9. The transformer according to claim 1, wherein two pins are respectively formed on two ends of each of the copper sheets, and the two pins are spaced apart from each other.

10. The transformer according to claim 1, wherein each of the iron core pieces has a case and a column, and the column is disposed in the case, wherein the column of one of the iron core pieces is disposed so as to pass through the locating piece and enters the through hole of the winding frame, wherein the column of another one of the iron core pieces is disposed so as to pass through the second baffle and enters the through hole of the winding frame, and the two cases of the two iron core pieces are electrically coupled to each other and are wrapped around the outside of the second coil.

11. The transformer according to claim 1, wherein a first area of the first baffle is smaller than a second area of the second baffle.

12. The transformer according to claim 1, further comprising a circuit board, disposed on the corresponding iron core piece and electrically coupled to the terminal socket.

13. The transformer according to claim 1, further comprising a cylindrical housing, wherein the second coil is disposed in the cylindrical housing, wherein each of the copper sheets has a plurality of pins, and the pins of the copper sheets protrude from the cylindrical housing.

14. The transformer according to claim 1, further comprising a plurality of cylindrical housings, wherein the copper sheets of the second coil are respectively disposed on the corresponding cylindrical housings.

* * * * *